United States Patent [19]
Vu et al.

[11] Patent Number: 5,958,088
[45] Date of Patent: Sep. 28, 1999

[54] PRISMATIC CELL CONSTRUCTION

[75] Inventors: Viet H. Vu, Medway, Mass.; Alexander Kaplan, Providence, R.I.; William T. McHugh, Westwood, Mass.

[73] Assignee: Duracell, Inc., Bethel, Conn.

[21] Appl. No.: 09/034,483

[22] Filed: Mar. 4, 1998

[51] Int. Cl.⁶ .............................. H01M 2/00; H01M 2/04; H01M 2/08; H01M 6/00
[52] U.S. Cl. .......................... 29/623.1; 429/94; 429/163; 429/175; 429/176
[58] Field of Search .............................. 429/94, 127, 162, 429/163, 175, 176; 29/623.1

[56] References Cited

U.S. PATENT DOCUMENTS

| | | |
|---|---|---|
| 3,897,265 | 7/1975 | Jaggard . |
| 4,482,613 | 11/1984 | Turchan et al. ........................... 429/53 |
| 4,729,162 | 3/1988 | Him et al. ............................... 29/623.3 |
| 4,794,057 | 12/1988 | Griffin ....................................... 429/94 |
| 4,894,295 | 1/1990 | Cheiky ...................................... 429/77 |
| 5,176,968 | 1/1993 | Blasi et al. .............................. 429/194 |
| 5,326,652 | 7/1994 | Lake ........................................ 429/127 |
| 5,391,365 | 2/1995 | Wang et al. ............................. 423/605 |
| 5,486,215 | 1/1996 | Kelm et al. ............................ 29/623.1 |
| 5,486,431 | 1/1996 | Tuttle et al. .............................. 429/66 |
| 5,549,717 | 8/1996 | Takeuchi et al. ....................... 29/623.2 |
| 5,556,722 | 9/1996 | Narukawa et al. ..................... 429/163 |
| 5,603,737 | 2/1997 | Marincic et al. ....................... 29/623.1 |
| 5,629,107 | 5/1997 | Shoida et al. ........................... 429/128 |

FOREIGN PATENT DOCUMENTS

| | | |
|---|---|---|
| 0 202 857 B1 | 7/1991 | European Pat. Off. . |
| 2 137 801 | 10/1984 | United Kingdom . |
| 95/06958 | 3/1995 | WIPO . |
| 97/38455 | 10/1997 | WIPO . |

*Primary Examiner*—Maria Nuzzolillo
*Assistant Examiner*—Jonathan Crepeau
*Attorney, Agent, or Firm*—Fish & Richardson P.C.

[57] ABSTRACT

An electrochemical cell is disclosed, having a sealed prismatic housing with two opposing, internal side surfaces defining therebetween an internal cavity having width and length. One of the side surfaces defines a convex arc, and the other of the side surfaces has a center portion opposing the convex arc of the one side surface, and features extending toward the one side surface and straddling the convex arc. An electrode stack is contained within the internal cavity of the housing, having positive and negative electrode sheets arranged in face-to-face relation. The electrode stack is arranged between the side surfaces of the housing such that the stack is retained between the one side surface and the extending features of the other side surface, and deflected to follow the convex arc to maintain contact pressure between the positive and negative electrode sheets. The stack is thus stretched across an inwardly crowned surface of the housing. The invention can, by maintaining good intersheet contact pressure within the stack, provide good overall active material utilization (for high cell capacity) and can help to inhibit housing distension of cells with broad sides. Methods of construction are also disclosed.

25 Claims, 5 Drawing Sheets

PRISMATIC CELL CONSTRUCTION

BACKGROUND OF THE INVENTION

This invention relates to prismatic electrochemical cells and the structure of their housings.

Electrochemical cell shapes are generally classified as either prismatic or cylindrical. Cylindrical cells have, as the name suggests, cylindrical housings. Common examples of cylindrical batteries are standard alkaline sizes AA, AAA, C and D. Prismatic cells have prismatic housing shapes, such as parallelepipeds. Common examples of prismatic cells include standard 12 V car batteries.

Many common types of cells have internal electrode configurations in which the electrodes are in sheet form, with sheets of positive and negative electrode material stacked together and separated by electrically insulating separator sheets. One of the reasons for this face-to-face sheet arrangement is to provide high diffusion area between opposing electrodes.

Ideally, adjacent sheets in the electrode stack remain in intimate "contact" (i.e., very close to each other) over the life of the cell. Suboptimal contact can reduce the overall capacity (total usable energy) of the cell, and can lead to other undesirable effects, such as lithium plating during the charging of Lithium ion (LiION) cells. In cylindrical cells, the stack of electrode and separator sheets is typically rolled up and placed in the can. Tension in the rolled up stack tends to press the stack against the sides of the can (i.e., to move toward its unwound condition) and maintains light pressure between adjacent electrode sheet faces. In prismatic cells, the stacked electrode sheets are either rolled up (as shown in FIG. 3) or folded back and forth (as shown in FIG. 4). The configuration of FIG. 3 may be called wound flat-wrap (WFW), while that of FIG. 4 may be referred to as fan fold or accordion fold.

In longer, thinner prismatic cells (cells with greater proportional distance between the folds or bends of the electrode stack), any tension in the folds or bends of the stack (tending to return the stack to a flat condition) can be insufficient to maintain an appropriate amount of pressure between the sheets along the entire length of the straight portions of the stack without positive compression applied by the side walls of the housing. Such positive compression may be provided by making the housing cavity slightly thinner than the nominal overall stack thickness, or by inserting a spring member (such as a leaf spring) within the housing to bias the straight portions of the stack together.

Positive compression against the straight portions of the electrode stack generally tends to bow the broad sides of the housing outward. This can add to the effect of internal cavity pressure to result in undesirable distortion of the outer cell shape if the sides of the housing are not constructed to adequately resist the applied bending moments. Of course, the stiffness of the housing side walls can be increased by increasing their thickness, but typically at a penalty of increased weight and, for a standard size cell, at a loss of internal volume. Internal springs can also occupy internal cell volume that may otherwise be available for active material.

SUMMARY OF THE INVENTION

The present invention provides a prismatic cell construction in which a desired pressure between adjacent electrode sheets can be maintained while preventing excessive outward bowing of the broad sides of the housing.

One aspect of the invention features an electrochemical cell having a sealed prismatic housing with two opposing, internal side surfaces (defining therebetween an internal cavity having width and length), and an electrode stack (including positive and negative electrode sheets arranged in face-to-face relation) contained within the internal cavity of the housing. One of the side surfaces of the housing defines a convex arc, and the electrode stack is arranged between the side surfaces of the housing such that the stack is deformed to follow the convex arc to maintain contact pressure between the positive and negative electrode sheets.

In some embodiments, the other of the side surfaces of the housing has a center portion opposing the convex arc of the one side surface, and features extending toward the one side surface and straddling the convex arc. The features are arranged to retain the electrode stack in its deformed position against the convex arc.

Preferably, the side surfaces are separated, near the center of their area, by a distance of less than about 50 percent of the length of the internal cavity.

Various embodiments of the invention include one or more of the following features. The convex arc spans substantially the length of the internal cavity. The other side surface defines a concave arc opposing the convex arc of the one side surface. The positive and negative electrode sheets are separated by a porous separator sheet. The positive and negative electrode sheets each have intercalated active materials. The first and second conductive sheets are each coated on only one side with active material. The sheets of the deflected stack are in tension along the convex arc of the one side surface. The housing is electrically isolated from all of said electrode sheets (i.e., the cell is "case neutral").

In some embodiments, the positive electrode sheet includes a first conductive sheet coated with an active material containing a metal oxide, and the negative electrode includes a second conductive sheet coated with an active material containing carbon, the housing also containing an electrolyte. In some cases, the metal oxide is lithiated and the electrolyte is organic. In some other cases, the electrolyte is aqueous.

Some cells built according to the invention are of a wound, flat-wrap configuration, and some are of an accordion fold (i.e., fan fold) configuration.

In some constructions, the housing includes a can and a cover, with one and the other of the can and cover each having, respectively, one and the other of the two opposing, internal side surfaces. In one presently preferred configuration, the can defines the convex arc. In some embodiments, the can and cover each consist of a single layer of stamped metal. In some other embodiments, the can and cover each consist of plastic and have substantially flat outer surfaces adjacent the internal side surfaces.

According to another aspect of the invention, an electrochemical cell has a sealed prismatic housing with two opposing broad sides (having width and length and defining therebetween an internal cavity), and an electrode stack (including positive and negative electrode sheets arranged in face-to-face relation) contained within the internal cavity of the housing. The housing includes a can defining a first of the broad sides of the housing, and a cover defining a second of the broad sides of the housing. One and the other of the first and second broad sides of the housing define, respectively, concave and convex arcs each spanning substantially the length of the sides. The concave and convex arcs are arranged in opposition such that the longitudinal centerline of the internal cavity defines a corresponding arc.

The positive and negative electrode sheets are separated by a porous separator sheet, and the electrode stack is arranged between the broad sides of the housing such that the stack is deflected to follow the concave and convex arcs to maintain contact pressure between the positive and negative electrode sheets.

According to yet another aspect of the invention, the electrode stack is arranged between the side surfaces of the above-described housing such that the stack is retained between the one side surface and extending features of the other side surface, and tensioned across the convex arc to maintain contact pressure between the positive and negative electrode sheets.

According to another aspect, an electrochemical cell has a housing defining an internal cavity bounded on one side by a curved surface, and an electrode stack contained within the internal cavity of the housing. The electrode stack includes positive and negative electrode sheets arranged in face-to-face relation, which are arranged in tension substantially across the extent of the sheets and disposed to follow the curvature of the curved surface bounding the cavity.

According to another aspect of the invention, a method of constructing the above-described electrochemical cell is provided. The method includes the steps of (1) arranging the electrode stack between the can and cover such that the electrode stack is disposed within the internal cavity of the housing with a face of the stack in contact with the convex arc;

(2) pressing the can and cover together, such that the electrode stack is deformed about the convex arc to produce contact pressure between the positive and negative electrode sheets; and (3) attaching the can to the cover with the electrode stack in its deformed state.

In some embodiments the method includes, before the step of arranging the electrode stack, either folding the electrode stack into a fan fold configuration or winding the electrode stack into a wound flat wrap configuration.

Other features and various advantages will be apparent from the description of the drawings, and from the claims.

DESCRIPTION OF EMBODIMENTS

Figure 1:
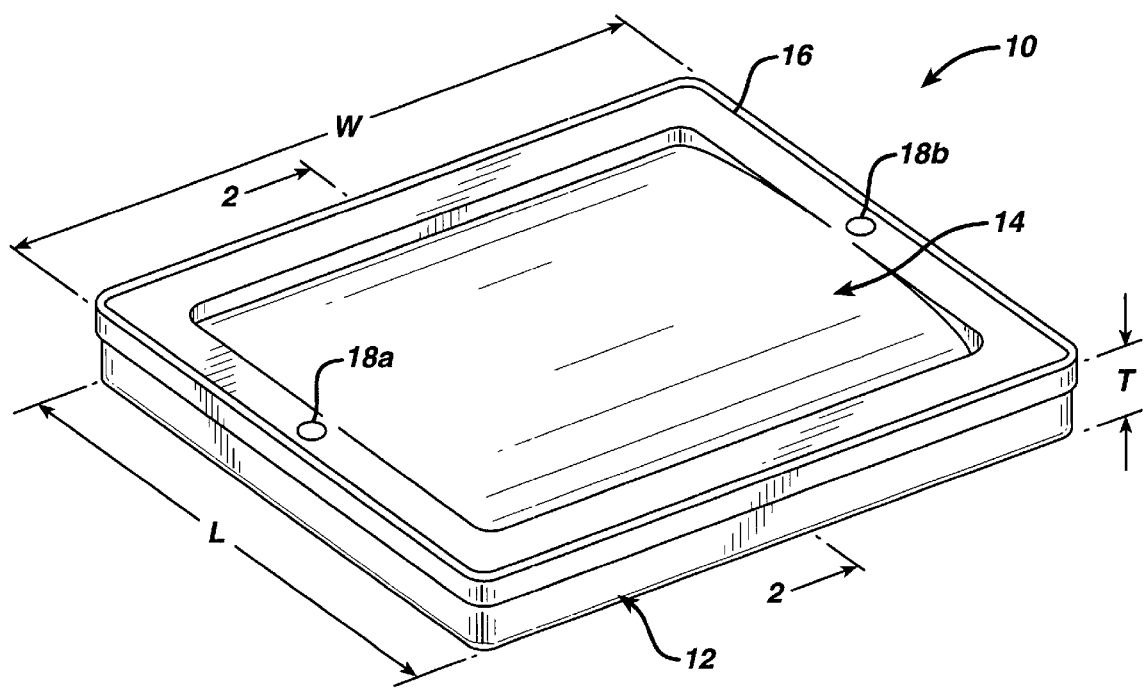
FIG. 1 is a perspective view of a prismatic cell with a stamped housing.

The prismatic cell 10 of FIG. 1 has an outer housing made up of a can 12 and a cover 14. The housing has a length, L, of 42 millimeters, a width, W, of 48 millimeters, and an overall thickness, T, of 4 millimeters. During assembly of the cell, cover 14 is pressed into can 12 and welded along joint 16 to seal the cell. Contacts 18a and 18b assembled in holes in cover 14 are in electrical communication with positive and negative electrodes, respectively, within the cell. The contacts are both electrically isolated from the housing, such that the cell is "case neutral". Both cover 14 and can 12 are of stamped 304 stainless steel.

Figure 2:
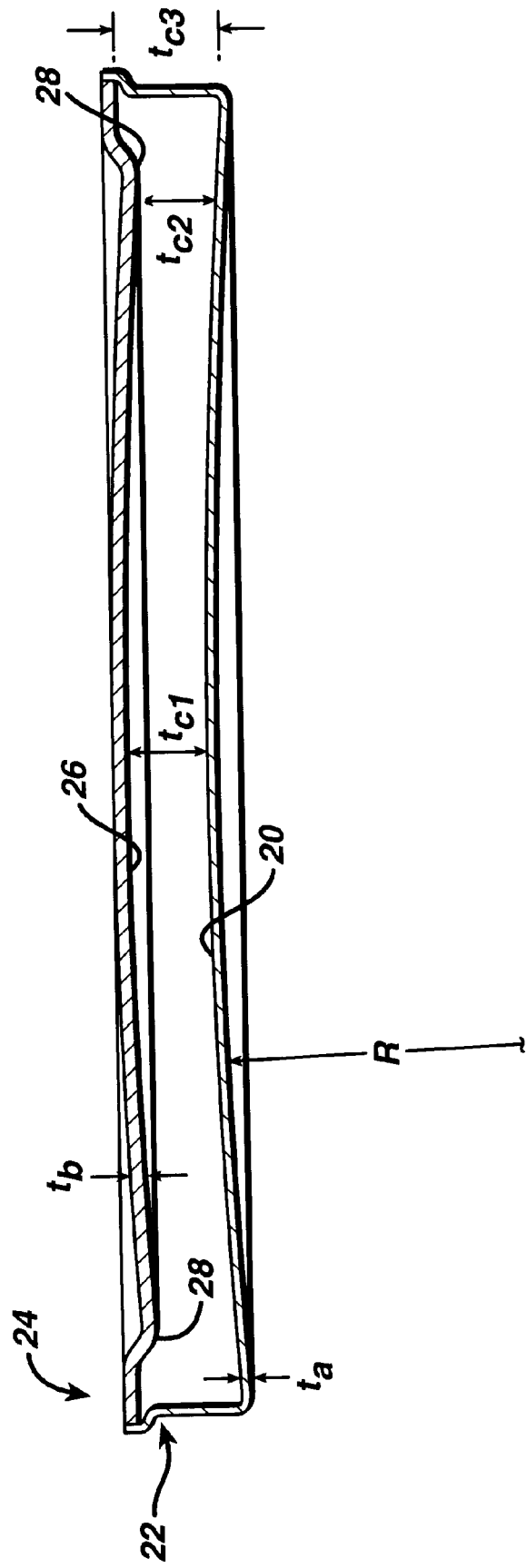
FIG. 2 is a cross-sectional view, taken along line 2—2 in FIG. 1.

Referring to FIG. 2, in which the contents of the cell are removed for clarity, the bottom of can 12 is crowned inward to form a gentle, smooth arc 20 of radius, R, of about 234 millimeters across substantially its entire length. The bottom of the can is crowned across its entire width, except at the edges of the can, such that practically the whole of the bottom of the can is crowned inward and the inner surface of the bottom of the can is convex. The nominal thickness of the bottom of the can, $t_a$, is 0.25 millimeter. A shoulder 22 is formed at the upper edge of the can to receive the outer edge of cover 14, such that the cover bottoms out on shoulder 22 during assembly.

Cover 14 is stamped to have a raised, narrow lip 24 about its perimeter, with the area circumscribed by the lip (over 90% of the area of the cover) crowned outward to form a gentle, smooth arc 26 to oppose the arc 20 of the bottom of the can. In other words, the inner surface of cover 14 is slightly concave, while the inner surface of the bottom of can 12 is convex. The nominal thickness of the cover, tb, is about 0.32 millimeter, and the radius of arc 26 is slightly greater than the radius, R, of arc 20, such that the minimum thickness of the internal cavity formed between can and cover is about 2.45 millimeters ($t_{c1}$, at the center of the cell), the cavity thickness increasing gradually from the center to 3.1 millimeters ($t_{c2}$) near lip 24, and then abruptly to 3.4 millimeters ($t_{c3}$) at lip 24. Another way to characterize the structure of cover 14 is that it has inwardly extending bosses 28 near two opposite outer edges, straddling arc 26. The peak of the crown of the cover, at the center of the cell, rises only about 0.1 millimeter above the plane of the outer surface of lip 24.

Figure 3:
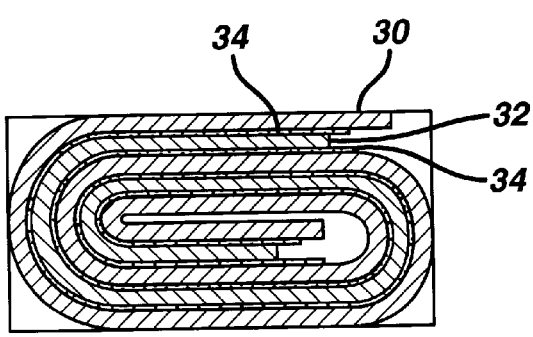
FIG. 3 illustrates a wound flat-wrap electrode configuration.
Figure 4:
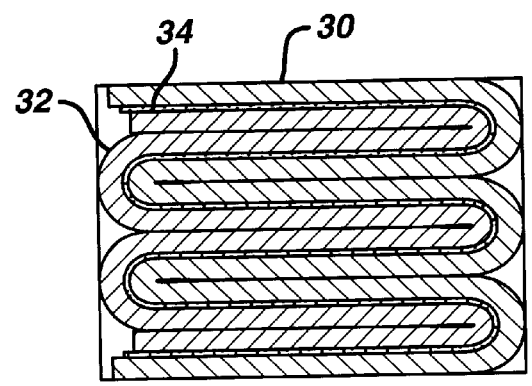
FIG. 4 illustrates a fan fold (accordion fold) electrode configuration.

FIGS. 3 and 4 illustrate alternate folding arrangements of electrode stacks in prismatic cells. In each case, the folded stack consists of a negative electrode sheet 30, a positive electrode sheet 32, and one or two separator sheets 34. Each electrode sheet consists of a layer of intercalated active material deposited on one side of an electrically conductive foil substrate. The electrode sheets are stacked with their active sides together, separated by a separator 34. The electrode sheets may be offset along their length to maximize their as-folded diffusion area. For the WFW arrangement of FIG. 3, an additional separator 34 is placed over the foil side of the positive electrode sheet to electrically insulate the foil sides of the two electrodes from each other. For the fan fold arrangement of FIG. 4, only the one separator 34 is used. As illustrated, the minimum bend radius of the outer electrode sheet in FIG. 3 is greater than the bend radii of the electrode sheets in FIG. 4, and therefore the WFW configuration may be more suitable with very thin electrode sheets having active materials which tend to crack or otherwise not perform well when bent at a tight radius. The electrode sheets should be flexible enough to resist cracking in their folded state. The foil substrate of negative electrode 30 is, as assembled, in electrical communication with the housing (a positive connection through a tab may be used to ensure the connection), and positive electrode 32 is attached to a housing feed through (e.g., contact 18a or 18b in FIG. 1) for contact with an external load. In a case neutral cell, such as the one shown in FIG. 1, the negative electrode is also electrically isolated from the housing (e.g., by another separator), and is connected to an additional contact. Electrode sheets with active material on both their sides may also be employed in the WFW configuration, in which case the active material on one side of each sheet is preferably offset along the length of the sheet from the active material on the other side of the sheet, in order to increase the utilization of the material near the ends of the sheets.

Figure 5:
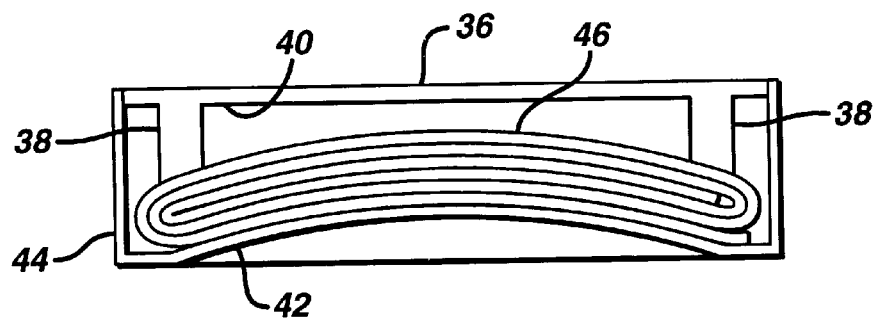
FIG. 5 schematically illustrates an electrode stack stretched across an arc.

FIG. 5 schematically illustrates how the structure of the housing of the cell of the invention can provide a good contact pressure between the electrode sheets. In this representative illustration, a flat cover 36 has two ribs 38 extending from its inner surface 40. The bottom 42 of the can 44 is crowned upward in the region between ribs 38. The electrode stack 46 is deflected by ribs 38, as the cover is inserted into the can, to follow the curvature of bottom 42. The force exerted by ribs 38 on the electrode stack retains the folded edges of the stack as the stack is deflected, thus imparting a residual tension in the individual sheets of the stack as they are, in effect, stretched over the crown of the bottom of the can. This residual tension, in the plane of the electrode sheets, results in a contact pressure between the individual electrode layers and between the electrode and the can. Even if only the upper layer of the electrode stack is tensioned by the assembly of the cover to the can, the electrode stack, deflected over a curved surface, will be subjected to a corresponding intersheet contact pressure. Note that this intersheet pressure does not require the flat, inner surface 40 of cover 36 to be loaded against, or even to touch, electrode stack 46. Rather, it is the engagement of the electrode stack near its edges, by ribs 38, before the stack is substantially deflected over the curved can bottom, that results in the desired tensioning of the electrode stack layers. Merely bending the stack to follow an arc, without causing its overall length to be increased, will not necessarily create intersheet pressure, as the individual sheets of the stack do not have enough bending stiffness to generate a load against the bottom of the can when "bent" to follow such a large radius.

As with the can illustrated in FIG. 2, the bottom 42 of can 44 of FIG. 5 is crowned inward, such that both the inner and outer surfaces of the bottom of the can are curved. The can bottom may be allowed to be deflected outward, therefore, by pressure exerted by either internal can pressure or contact pressure from the electrode stack, without extending beyond the rectangular outer envelope of the housing.

Figure 6:
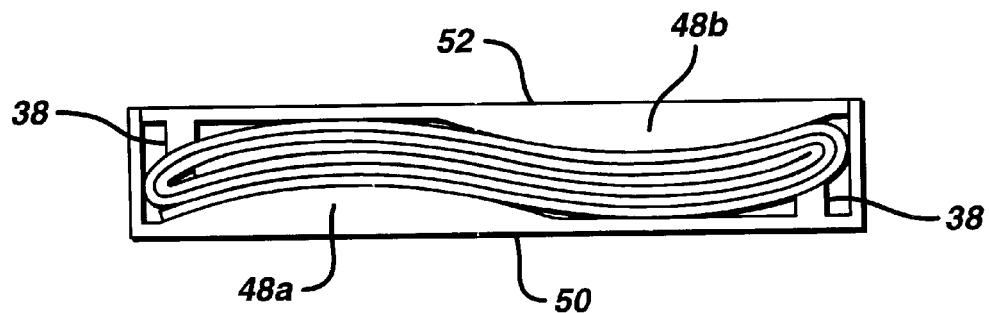
FIG. 6 shows an electrode stack stretched across adjacent arcs.

The electrode stack may be stretched over two or more alternating curves, as shown in FIG. 6. In the configuration shown, electrode stack 46 is stretched across a curved portion 48a of can 50, and across an adjacent curved portion 48b of cover 52. Note that the curved portions 48a and 48b combine to extend across substantially the entire distance between ribs 38, and that they overlap at the center of the cell, such that deflected stack essentially has no appreciable flat region. Although a WFW electrode stack 46 is shown in FIGS. 5 and 6, a fan fold configuration may also be used in either arrangement.

Figure 7:
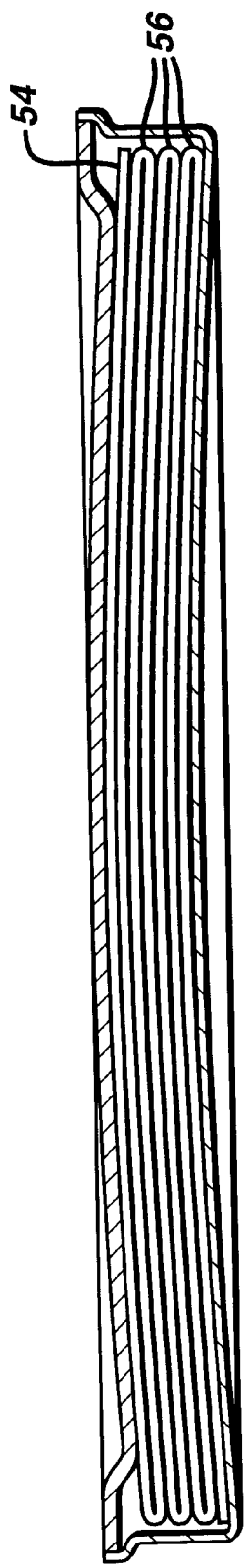
FIG. 7 is a wound flat-wrap embodiment of the cell of FIG. 2.

FIG. 7 illustrates a LiION cell with the housing of FIG. 2 and a fan fold electrode stack 54. Each layer consisting of negative electrode, separator and positive electrode is illustrated as a single fold for clarity. At each end of the stack are three 180 degree bends 56 of the stack, such that there are a total of seven such layers extending generally in parallel across the length of the cell. In this embodiment, the positive electrode has a length of 301 millimeters, a thickness of 0.13 millimeter, and a width of 63 millimeters, with 28.36 milligrams of a lithiated metal oxide per square centimeter of electrode area. The negative electrode has a length of 309 millimeters, a thickness of 0.13 millimeter, and a width of 65 millimeters, with 13.05 milligrams of carbon per square centimeter of electrode area. The micro-porous polyethylene-polypropylene separator has a thickness of 0.025 millimeters. Preferably, the face-to-face capacities of the electrodes are matched to help reduce lithium plating during charge. In testing, the resulting fan fold prismatic cell, with the curved housing of FIG. 2, produced 0.686 amp-hours of usable energy.

The total nominal thickness of the fan fold electrode stack, with its seven layers, is seven times (0.13+0.025+ 0.13), or about 2.0 millimeters (i.e., about 0.45 millimeter less than the minimal distance of 2.45 millimeters between the cover and can at the center of the cell). Thus, the intersheet contact pressure at the center of the can is not the result of compression from the cover, but of the tension in the stack. Residual bending stresses in the electrode and separator sheets at bends 56 cause the stack to tend to assume a greater overall thickness at its edges than at the center of the cell, such that during assembly of the cover to the can the bosses 28 of the cover (FIG. 2) contact the electrode stack first, pinching it near its edges as the cover is lowered into place.

Figure 8:
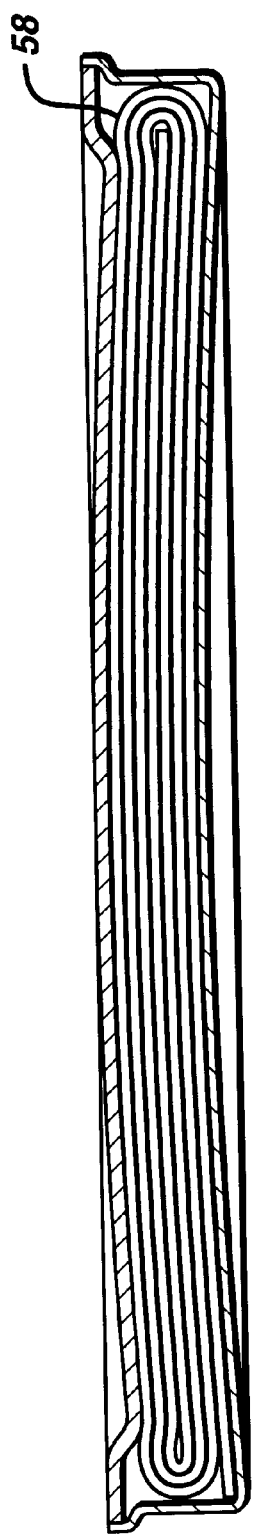
FIG. 8 is a fan fold embodiment of the cell of FIG. 2.

The same principles apply to the WFW configuration, as shown in FIG. 8. Near its folded edges, the stack 58 assumes an overall thickness greater than the summation of the thicknesses of its layers due to residual bending stresses at the edges of the stack. In this configuration, the positive and negative electrodes have lengths slightly less than in the fan fold configuration, due to the thickness of the layers at the edges of the stack. Otherwise, the electrode and separator sheets are identical in construction to those used in the fan fold embodiment discussed above. As with the fan fold arrangement, there are a total of seven stack layers across the thickness of the cell. With the WFW stack, however, the nominal stack thickness at the center of the cell is seven times (0.13+0.025+0.13+0.025), or 2.17 millimeters (still less than the minimum cavity thickness of 2.45 millimeters). As discussed above with respect to FIG. 5, the bottom of the can in the embodiments of FIGS. 7 and 8 may be deflected outward by internal pressure or stack forces without extending beyond the plane defined by the bottom edges of the can. In addition, the cover and the can bottom are more rigid than flat plates of equivalent size and thickness, and able to resist internal loads and pressures with less resultant outward deflection. They are also thus more able to resist external loads and/or pressures.

Figure 9:
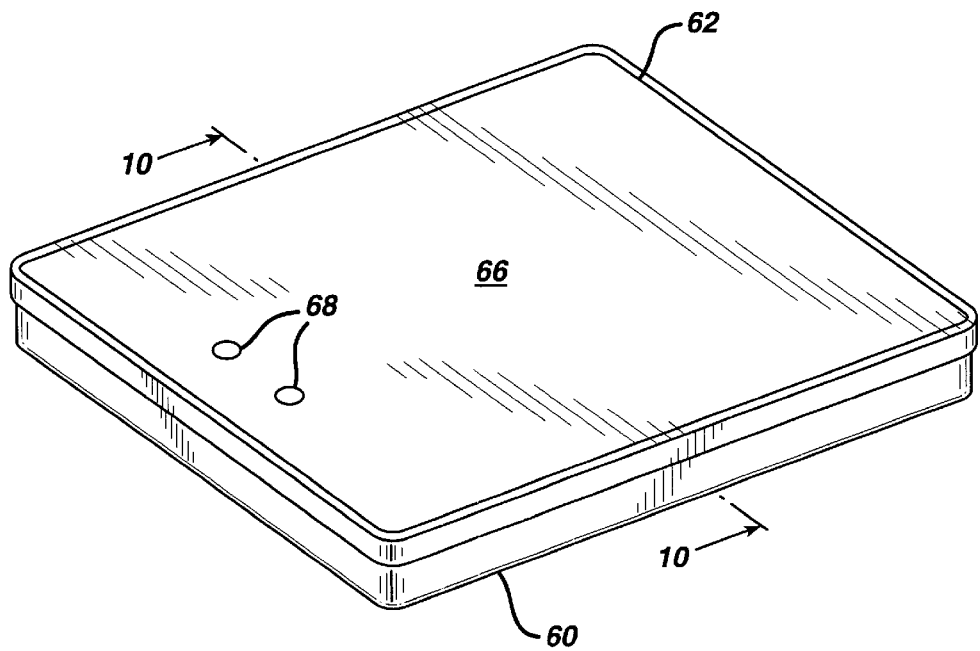
FIG. 9 is a perspective view of a prismatic cell with a molded housing.
Figure 10:
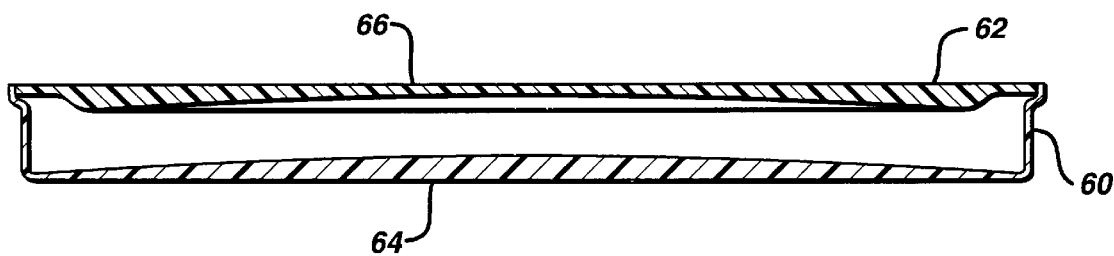
FIG. 10 is a cross-sectional view, taken along line 10—10 in FIG. 9.

The housings of FIGS. 1, 2, 7 and 8 have all been of stamped metal, such as stainless or nickel-plated cold rolled steel, and have had curved outer surfaces corresponding to their curved inner surfaces. In another embodiment shown in FIGS. 9 and 10, the housing 60 and cover 62 are of molded plastic, with flat outer surfaces 64 and 66, respectively. Each has been molded to provide a curved inner surface, as shown in FIG. 10, to provide the same stack tensioning as described above with respect to the stamped metal embodiments. Two pass throughs are provided in the cover for mounting contacts 68.

Other embodiments and features are also within the scope of the following claims. For instance, the stack-tensioning concept of the invention may be combined with other known techniques, such as compression loading between can and cover, to provide even more intersheet pressure within the broad layers of the electrode stack.

What is claimed is:

1. An electrochemical cell comprising
   a sealed prismatic housing with two opposing, internal side surfaces defining therebetween an internal cavity having width and length, one of said side surfaces defining a convex arc; and
   an electrode stack contained within the internal cavity of the housing, the electrode stack comprising positive and negative electrode sheets arranged in face-to-face relation, the electrode stack arranged between said side surfaces of the housing such that the stack is deformed to follow the convex arc to maintain contact pressure between the positive and negative electrode sheets.

2. The electrochemical cell of claim 1 wherein the other of said side surfaces has a center portion opposing the convex arc of the one side surface, and features extending toward the one side surface and straddling the convex arc, the features arranged to retain the electrode stack in its deformed position against the convex arc.

3. The electrochemical cell of claim 1 wherein the convex arc spans substantially the length of the internal cavity.

4. The electrochemical cell of claim 1 wherein the other side surface defines a concave arc opposing the convex arc of the one side surface.

5. The electrochemical cell of claim 1 wherein the positive and negative electrode sheets are separated by a porous separator sheet.

6. The electrochemical cell of claim 1 wherein the positive and negative electrode sheets each comprise intercalated active materials.

7. The electrochemical cell of claim 1 wherein
   the positive electrode sheet comprises a first conductive sheet coated with an active material containing a metal oxide; and
   the negative electrode comprises a second conductive sheet coated with an active material containing carbon;
   the housing further containing an electrolyte.

8. The electrochemical cell of claim 7 wherein the metal oxide is lithiated and the electrolyte is organic.

9. The electrochemical cell of claim 7 wherein the electrolyte is aqueous.

10. The electrochemical cell of claim 1 wherein the electrode stack is of wound, flat-wrap configuration.

11. The electrochemical cell of claim 1 wherein the electrode stack is of accordion fold configuration.

12. The electrochemical cell of claim 6 wherein the first and second conductive sheets are each coated on only one side with active material.

13. The electrochemical cell of claim 1 wherein the housing comprises a can and a cover, one and the other of the can and cover each comprising, respectively, one and the other of said two opposing, internal side surfaces.

14. The electrochemical cell of claim 13 wherein the can defines said convex arc.

15. The electrochemical cell of claim 13 wherein the can and cover each consist of a single layer of stamped metal.

16. The electrochemical cell of claim 13 wherein the can and cover each consist of plastic and have substantially flat outer surfaces adjacent said internal side surfaces.

17. The electrochemical cell of claim 1 wherein the sheets of the deflected stack are in tension along the convex arc of the one side surface.

18. The electrochemical cell of claim 1 wherein the housing is electrically isolated from all of said electrode sheets.

19. The electrochemical cell of claim 2 wherein said side surfaces are separated, near the center of their area, by a distance of less than about 50 percent of the length of the internal cavity.

20. An electrochemical cell comprising
    a sealed prismatic housing with two opposing broad sides having width and length and defining therebetween an internal cavity, the housing comprising
       a can defining a first of the broad sides of the housing, and
       a cover defining a second of the broad sides of the housing, one and the other of the first and second broad sides of the housing defining, respectively, concave and convex arcs each spanning substantially the length of the sides, the concave and convex arcs arranged in opposition such that the longitudinal centerline of the internal cavity defines a corresponding arc; the cell further comprising
       an electrode stack contained within the internal cavity of the housing, the electrode stack comprising positive and negative electrode sheets arranged in face-to-face relation and separated by a porous separator sheet, the electrode stack arranged between the broad sides of the housing such that the stack is deflected to follow the concave and convex arcs to maintain contact pressure between the positive and negative electrode sheets.

21. An electrochemical cell comprising a prismatic housing with two opposing, internal side surfaces defining therebetween an internal cavity having width and length,
    one of said side surfaces defining a convex arc,
    the other of said side surfaces having a center portion opposing the convex arc of the one side surface, and features extending toward the one side surface and straddling the convex arc; and
    an electrode stack contained within the internal cavity of the housing, the electrode stack comprising positive and negative electrode sheets arranged in face-to-face relation, the electrode stack arranged between said side surfaces of the housing such that the stack is retained between the one side surface and the extending features of the other side surface, and tensioned across the convex arc to maintain contact pressure between the positive and negative electrode sheets.

22. An electrochemical cell comprising
    a housing defining an internal cavity bounded on one side by a curved surface; and
    an electrode stack contained within the internal cavity of the housing, the electrode stack comprising positive and negative electrode sheets arranged in face-to-face relation, the electrode sheets arranged in tension substantially across the extent of the sheets and disposed to follow the curvature of said curved surface.

23. A method of constructing an electrochemical cell, the cell comprising
    a prismatic housing with two opposing broad sides having width and length and defining therebetween an internal cavity, the housing comprising
       a can defining a first of the broad sides of the housing, and
       a cover defining a second of the broad sides of the housing,
    one of the first and second broad sides of the housing defining a convex arc; and
    an electrode stack contained within the internal cavity of the housing, the electrode stack comprising positive and negative electrode sheets arranged in face-to-face relation and separated by a porous separator sheet; the method comprising the steps of arranging the electrode stack between the can and cover such that the electrode stack is disposed within the internal cavity of the housing with a face of the stack in contact with the convex arc;

pressing the can and cover together, such that the electrode stack is deformed about the convex arc to produce contact pressure between the positive and negative electrode sheets; and attaching the can to the cover with the electrode stack in its deformed state.

24. The method of claim 23 further comprising, before the step of arranging the electrode stack, folding the electrode stack into a fan fold configuration.

25. The method of claim 23 further comprising, before the step of arranging the electrode stack, winding the electrode stack into a wound flat wrap configuration.

* * * * *